United States Patent

[11] 3,601,796

[72] Inventor Rudolf G. Mortimer
 Ann Arbor, Mich.
[21] Appl. No. 27,670
[22] Filed Apr. 13, 1970
[45] Patented Aug. 24, 1971
[73] Assignee John D. Campbell
 Livonia, Mich.

[54] ACCELERATOR RELEASE SIGNAL LIGHT DELAY ACTUATOR
 7 Claims, 1 Drawing Fig.
[52] U.S. Cl. .................................................. 340/71,
 340/56
[51] Int. Cl. ................................................ B60q 1/26
[50] Field of Search ..................................... 340/52, 56,
 66, 67, 71, 72, 74, 262

[56] References Cited
 UNITED STATES PATENTS
 3,243,773 3/1966 Leichsenring ............... 340/72
 3,281,786 10/1966 Leichsenring ............... 340/72 X
 3,300,756 1/1967 Miller ........................... 340/72
 3,305,829 2/1967 Knez ............................ 340/72
Primary Examiner—Alvin H. Waring
Attorney—Cullen, Settle, Sloman and Cantor ABSTRACT: An accelerator release signal light delay actuator in a vehicle electric circuit to actuate signal lamps on the vehicle after a time interval of 4 to 8 seconds whenever the accelerator is continuously in an engine idle position and the ignition switch is closed. The lamp is operated at less than normal available voltage but will operate at normal available voltage when the vehicle brake is applied. The signal lamp remains lighted until the accelerator pedal is depressed or the ignition switch is opened.

20 — $Q_1$ - UNIJUNCTION TRANSISTOR
19 — $Q_2$ - SILICONE CONTROLLED RECTIFIER (THYRISTOR)
18 — $Q_3$ - POWER TRANSISTOR

PATENTED AUG 24 1971
3,601,796
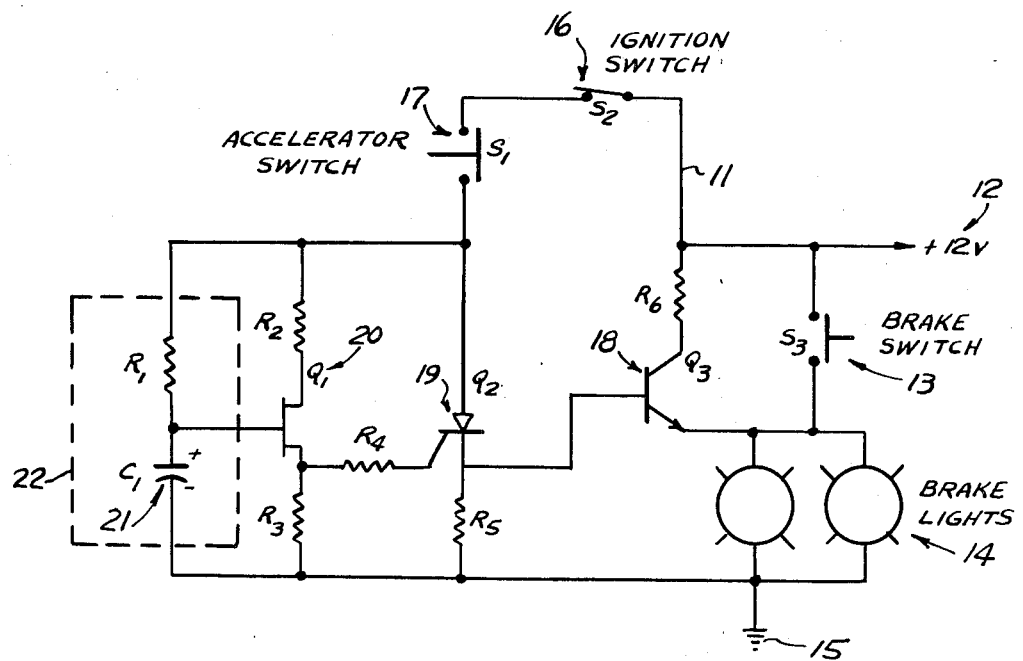
20 — $Q_1$ — UNIJUNCTION TRANSISTOR
19 — $Q_2$ — SILICONE CONTROLLED RECTIFIER (THYRISTOR)
18 — $Q_3$ — POWER TRANSISTOR
INVENTOR
RUDOLF G. MORTIMER
BY *Cullen, Settle, Doman & Cantor*
ATTORNEYS

ACCELERATOR RELEASE SIGNAL LIGHT DELAY ACTUATOR

BACKGROUND OF THE INVENTION

Heretofore, it has been recognized the need for a signal to trailing vehicles when the vehicle in front is decelerating and to provide sufficient reaction time so that the trailing vehicle can apply brakes if necessary. Various efforts have been made to provide accelerator pedal control switches which upon release of the pedal will energize a vehicle light such as the brake light as such a warning.

Since there are situations where a temporary release of the accelerator does not necessarily means a subsequent application of the brakes and, accordingly, there is a need for such warning light. However, the need is for a warning light that will go on after a short interval after release of the accelerator pedal rather than to go on instantly.

BRIEF DESCRIPTION OF THE INVENTION

It is an object of this invention to solve this problem by the provision of an accelerator release signal light delay actuator wherein a time interval from 4 to 8 seconds will elapse after the accelerator pedal has been released before a signal will be energized, such as a vehicle light or the normal service brake light.

It is another object to provide within a conventional electrical circuit for a motor vehicle of a normally closed ignition switch together with an accelerator controlled normally open switch and incorporating a time delay device in said circuit with said accelerator switch which when closed, by release of the accelerator pedal, will over a limited period in a range of 4 to 8 or 9 seconds, function so as to control electronic switching means for actuation of the signal light.

These and other objects will be seen from the following specification and claims in conjunction with the appended drawing in which:

The figure is a schematic diagram of the circuit involved with associated switches of the present accelerator signal light delay actuator.

DETAILED DESCRIPTION

Referring to the drawing, the present signal light delay actuator is incorporated within an electrical circuit generally indicated at 11 for a motor vehicle which has an accelerator and which includes a DC power source such as the 12 volt source shown in the drawing at 12.

As part of the conventional circuit that is provided is a normally open brake switch 13 controlled by the vehicle brakes and which is connected to brake lights 14 grounded at 15.

It will be understood that for the purpose of the present invention, light 14 could be an ordinary light independent of the brake lights normally placed at the rear of the vehicle as a signal mechanism.

In the present illustrative embodiment, the signal light has been incorporated into the brake lights 14 in the circuit shown in the drawing.

The conventional vehicle accelerator is connected with a normally open accelerator switch 17 which is connected in series with the normally closed ignition switch 16.

Interconnected into the circuit with power source 12 to the said brake light is the secondary parallel circuit which includes resistance R6 and the power transistor 18 designated also by the letter Q3, said power transistor being normally nonconducting. Said power transistor, when in a conducting condition, is adapted to deliver electric current to the lights 14 grounded at 15, but at a voltage reduced from the normal 12 volts due to the voltage drop over resistance R6 and the said power transistor to thus produce in the light 14 an illumination which is normally less than the usual intensity if the brake switch were manually applied.

In such condition, it is seen that with the brake switch 13 closed, the full power of 12 volts is transmitted to the brake light for intensity which is greater than intensity of light which would be produced by the current flowing through the power transistor circuit 18.

The present circuit includes a time delay device generally indicated at 22 in the drawing and which includes in the circuit capacitor C1 generally indicated at 21 in series with resistance R1.

The junction between said resistance and capacitor is connected to the unijunction transistor Q1, also designated at 20, which includes on its opposite sides the resistances R2 and R3 shown in the drawing.

The junction between resistance R3 and the unijunction transistor is connected by resistance R4 to the silicon-controlled rectifier (Thyristor) Q2 which is designated by the numeral 19 to provide the power lead for turning on power transistor Q3.

The unijunction transistor Q1 is normally nonconducting but, in a manner hereafter described, will become conducting when the capacitor C1 has charged up towards the normal 12 voltage to a point which corresponds with a predetermined trigger voltage of said unijunction transistor.

OPERATION

With the ignition switch S2 closed, power is applied to the time delay circuit 22 through the accelerator switch S1. S1 closes when the accelerator is released and C1 capacitor starts charging towards 12 volts or whatever the available power source voltage happens to be. This charging is through resistance R1 having a time constant $R_1C_1$. This time constant can be adjusted within the range of 4–8 seconds, for illustration, and in the illustrative embodiment, has been set at 5 seconds.

Five seconds after S1 is closed, the voltage across C1 reaches the unijunction transistor trigger voltage and Q1 fires, discharging C1 through R3.

The voltage pulse developed across R3 fires the Thyristor Q2 which turns on the power transistor Q3.

Thus, a reduced voltage determined by a voltage drop across R6 and Q3 is applied to the brake lights, thus energizing the same at an intensity normally less than the usual intensity determined by application of the brake switch.

Normal voltage is applied to the brake lamps through S3 when the brakes are applied. When S3 closes, Q3 transistor stops conducting, but the Thyristor Q2 is held on by the current through resistance R5, so as when the brakes are released, Q3 again conducts to hold the brake lamps on at the reduced brightness.

Accelerator application opens S1 which turns Q2 and Q3 off and extinguishes the brake lights. Also opening S1 causes Q1 to fire and to discharge C1, leaving the circuit ready for the start of the next cycle.

The present device is to provide a signal at the rear of a motor vehicle whenever the accelerator remains in the engine idle position for at least 5 seconds, or in the range of 4 to 8 seconds approximately.

The signal is shown to the rear of the vehicle by separate lamps or by the existing stop lamp 14. The device will operate the signal lamp at less than prevailing voltage of the power source 12 so that when the service brake is applied, the voltage applied to the signal lamp 14 rises to the prevailing level, resulting in an increase in the intensity of the signal lamp to give a further signal showing that the brakes are applied. The signal will remain on until the accelerator is next depressed, opening the accelerator switch 17, or until the vehicle ignition switch 16 is turned off.

The main features of the device are:
a. A means to delay actuation of a signal light for 5* seconds after the accelerator pedal has been continuously released in the throttle idle position.

*Approximate value. Desired range of values is about 4–8 seconds.

b. To hold the signal on until the accelerator is depressed from the throttle idle position.
c. To drop the prevailing voltage to the signal lamps when they are actuated by the device.
d. When the service brake is depressed the voltage applied to the signal lamps is raised to the prevailing level.
e. The device operates only when the ignition is turned on.

While the illustrative embodiment shows one form of time delay device for controlling the lights 14 independent of the brake switch circuit, it is contemplated that other electrical time delay devices may accomplish this result, including thermomechanical devices.

Having described my invention, reference should now be had to the following claims.

I claim:

1. In a electrical circuit for a motor vehicle having an accelerator and including a DC power source, a light and a normally closed ignition switch;
   an accelerator release signal light delay actuator for said light comprising a normally open accelerator switch in series with said ignition switch and adapted to close on release of accelerator;
   a normally nonconducting power transistor adapted when turned on to deliver electric power to said light and energizing same;
   a time delay device in circuit with said accelerator switch when closed including a resistance and capacitor;
   a unijunction transistor having a predetermined trigger voltage connected to and controlled by said capacitor, as it progressively charges up to said trigger voltage over a predetermined interval when said accelerator switch is closed;
   and a silicon controlled rectifier in said circuit interposed between said unijunction transistor and power transistor, whereby when the unijunction transistor fires, said capacitor discharges, developing a voltage pulse which fires the silicon controlled rectifier which turns on said power transistor.

2. In the accelerator release signal light delay actuator of claim 1, a first resistance in said circuit between said power transistor and power source whereby said light is energized by normally reduced voltage determined by the voltage drop across said first resistance and power transistor energizing said light to a predetermined intensity.

3. In the accelerator release signal light delay actuator of claim 1, said light being a brake light, and a normally open brake switch in circuit with said light whereby closing of said brake switch directly energizes said light to full normal voltage at a predetermined intensity, said power transistor being no longer conducting.

4. In the accelerator release signal light delay actuator of claim 2, said light being a brake light;
   and a normally open brake switch in circuit with said light whereby closing of said brake switch directly energizes said light to full normal voltage at a predetermined increased intensity, said power transistor being no longer conducting.

5. In the accelerator release signal light delay actuator of Claim 1, said time delay being in the range of 4 to 8 seconds.

6. In the accelerator release signal light delay actuator of claim 1, a resistor between said unijunction transistor and the ground side of said circuit, for determining the extent of voltage pulse delivered on discharging of said capacitor through said resistance.

7. In an electrical circuit for a motor vehicle having an accelerator and including a DC power source, a light and a normally closed ignition switch;
   an accelerator release signal light delay actuator for said light comprising a normally open accelerator switch in series with said ignition switch and adapted to close on release of accelerator;
   a normally nonconducting power transistor adapted when turned on to deliver electric power to said light and energizing same;
   a time delay device in circuit with said accelerator switch when closed including a unijunction transistor having a predetermined trigger voltage, said time delay device adapted to progressively charge up to said trigger voltage over a predetermined interval when said accelerator switch is closed;
   and a silicon controlled rectifier in said circuit interposed between said unijunction transistor and power transistor, whereby when the unijunction transistor fires, a voltage pulse is developed through said unijunction transistor which fires the silicon controlled rectifier turning on said power transistor.